United States Patent [19]

Becavin et al.

[11] Patent Number: 5,172,124
[45] Date of Patent: Dec. 15, 1992

[54] METHOD AND DEVICE TO MEASURE THE INTEGRITY OF A TRANSMISSION

[75] Inventors: Henri Becavin, Bretigny S/Orge; Charles Louvard, Paris, both of France

[73] Assignee: Thomson-CSF, Puteaux, France

[21] Appl. No.: 763,277

[22] Filed: Sep. 20, 1991

[30] Foreign Application Priority Data

Sep. 26, 1990 [FR] France ............... 90 11861

[51] Int. Cl.$^5$ ............. H01Q 3/00; G01S 7/40; G01S 3/16
[52] U.S. Cl. .................... 342/360; 342/173; 342/383
[58] Field of Search ............ 342/360, 173, 383

[56] References Cited

U.S. PATENT DOCUMENTS

| | | | |
|---|---|---|---|
| 3,713,160 | 1/1973 | Becavin | 342/414 |
| 4,005,427 | 1/1977 | Hofgen | |
| 4,027,289 | 5/1977 | Toman | 342/360 |
| 4,068,236 | 1/1978 | Alford | |
| 4,414,632 | 11/1983 | Murrell | |
| 4,417,250 | 11/1983 | Grousseau | 342/405 |
| 4,926,186 | 5/1990 | Kelly et al. | 342/360 |

FOREIGN PATENT DOCUMENTS

0170231 2/1986 European Pat. Off.

OTHER PUBLICATIONS

Institute of Electrical and Electronics Engineers, Proceedings of the Annual Reliability and Maintainability Symposium, Washington, 28–30 Jan. 1975, U.S., New York, IEEE, 1975, pp. 179–187, Genese Fileccia, et al., "Mathematical Modeling of . . . ".

Primary Examiner—Gregory C. Issing
Attorney, Agent, or Firm—Oblon, Spivak, McClelland, Maier & Neustadt

[57] ABSTRACT

Device and method for permanently checking the integrity of a transmission affected by parameters not directly accessible to measurement and whose influence on the modulus and phase of the field radiated in space can be determined by utilizing a mathematic model, the transmission being from an antenna array. Each antenna is supplied with one or more Hf carrier frequencies, each being modulated in a known way by one or more sinusoidal low frequency signals. First, a recording is made, at least at one point and during a time period T, of the amplitude of the combination of the signal received at this point and of a reference signal, having a fundamental frequency equal to one of the HF frequencies of the signal to be analyzed. Then, the amplitude of low frequency components of the signal thus obtained is extracted and memorized. Then, steps 1 and 2 are repeated n times (n is a whole number) in recording the signal at the same point and in carrying out, at each time, a phase shift of the reference signal by a quantity $$a_k = \frac{2\pi}{n},$$

k is a whole number successively assuming all values between 1 and n. The n amplitudes thus memorized are processed as the n values of function $F(a_k)$, from which values certain coefficients of its Fourier transform are extracted. The operations 1 to 4 are then repeated at least as many times as there are points of measurement. Values of the unknown parameters are then determined using the mathematical model.

31 Claims, 6 Drawing Sheets

METHOD AND DEVICE TO MEASURE THE INTEGRITY OF A TRANSMISSION

BACKGROUND OF THE INVENTION

1. Field of the Invention

The invention relates to the field of measurement methods and devices designed to check the integrity of a transmission, especially the integrity of the transmission of a signal transmitted by a radio beacon.

It is known that a radio beacon is a radio device transmitting a set of signals on a carrier frequency that is generally a VHF or UHF frequency. These signals are transmitted in such a way that a moving body, provided with an appropriate receiver tuned to the frequency of the carrier, can use this signal to determine the angular position of the axis, coming from the transmitter, on which this moving body is positioned. Radio beacons may be omnidirectional or directional. Among omnidirectional radio beacons, there is the radio beacon internationally known as the VOR (VHF Omnidirectional Range) beacon that enables an appropriately equipped aircraft to make an ad hoc determination of the angle of the axis, coming from the radio beacon, on which this aircract is positioned in relation to the magnetic north at the position of the radio beacon. Directional radio beacons include, for example, the devices internationally known as ILS (Instrument Landing System) devices. These radio beacons can be used for the determination, in space, of a glide path towards a runway. The signals transmitted by the radio beacons are generally transmitted by an array of antennas, each antenna of the array being powered by a H.F. signal that is modulated in a specific way.

2. Description of the Prior Art

The exactness of the information on a position that may be got from the radio beacons directly depends on the ability of these instruments to transmit a signal that remains within determined norms. In the case of radio beacons such as those of the VOR or ILS systems, these standards are defined by the International Civil Aviation Organization (ICAO). Thus, for example, chapter 3.1. of the document "Appendix 10", published by the ICAO, is devoted to the technical specifications of the ILS.

According to &3.1., the I.L.S. includes the following basic elements:
a) Localizer radio beacon
b) Glide path radio beacon
c) Radio markers The localizer radio beacon defines a vertical plane, which is the locus of the zero DDM points and contains the runway axis.

The glide path radio beacon defines a surface, the locus of the zero DDM points, whose intersection with the plane of the localizer defines the guidance path.

The radio markers give positional indications with respect to the runway threshold.

The abbreviation DDM designates the difference between the depths of modulation of the carrier by two low-frequency 90 Hz and 150 Hz voltages. The DDM constitutes the guidance signal exploited by the aircraft.

Apart from the performance characteristics themselves, the main requirements relate to the following two points:

continuity of operation: a quality wherein the radiated signal is seldom interrupted;

integrity of the I.L.S.: a quality related to the reliance that can be placed on the exactness of the information given by the installation.

In the I.C.A.O. document, &.3.1.2.6. states that the essential purpose of an ILS installation is to set up and maintain the highest possible degree of integrity, dependability and operating stability of the system under the most unfavorable environmental conditions that might be encountered. The supplement C to the first part contains indications to enable this aim to be achieved.

2.8.2.13 states that, as a rule, the designing of the control equipment relies on the principle of a continuous check of the electromagnetic signals radiated to specific points within the coverage volume, this check making it possible to ensure that they comply with the standards laid down in 3.1.3.11 and 3.1.5.7.

To comply with these directives, the device for checking the integrity of the glide path signal comprises, firstly, a sensor placed in the vicinity of the transmission mast at a position representing the signal transmitted on the glide path and, secondly, a device constituted by couplers measuring the antenna currents and recombining them so as to reconstitute the signal theoretically received in two other directions. With respect to the VOR, the device has at least one sensor located in the vicinity of the antenna array.

The results of the measurements made with these devices should remain within predetermined brackets. The chief drawback of this mode of checking integrity is pointed out by the ICAO, again in appendix 10 on the ILS.

The document states that although this check indicates, to a certain extent, that the electromagnetic signal anywhere else in the volume of coverage is also within the limits of tolerance, this observation is largely got through induction.

It is therefore indispensable to carry out periodic and meticulous checks in flight and on the ground in order to ensure the integrity of the electromagnetic signal throughout the volume of coverage.

For, the field in the vicinity of the onboard receiver is disturbed by all the parasitic reflections coming from the near or distant environment.

This means that the value of the field at a given point depends on the value of the fields radiated in all the other directions and any modification of the antenna patterns is liable to modify the guidance signal at the point of use.

Herein lies the main obstacle to guaranteeing the integrity of the signal in space and the main shortcoming of presently used checking devices. These devices actually measure only representative samples of the signal transmitted in two or three pre-determined directions. While these devices are capable of taking account, in a comprehensive way, of most of the parameters, they can be used neither to make a precise evaluation of the respective values of these parameters nor to determine the field transmitted in every direction of space.

SUMMARY OF THE INVENTION

The invention is aimed at overcoming this drawback by providing a method and a device that can be used to ascertain, permanently, that the signal received at a point of space within the volume of the coverage is in accordance with the standard defined by the ICAO in the case of radio beacons, or within the standard defined by the manufacturer of a transmitter in more general cases. Since it is not possible to consider the placing of sensors throughout the space concerned, the method of the invention relies essentially on computation. To be in a position to carry out these computations, it is necessary, first of all, to have a reliable mathematical model representing the characteristic parameters of the signal received at a point as a function of the coordinates of this point. It is then necessary to measure all the variables needed to carry out the computation defined by the model. Now, in the present state of knowledge, the models envisaged make use of variables that cannot be measured permanently without interrupting the transmission. Such variables are, for example, the gains of the antennas, which can vary as a function of meteorological conditions, essentially the presence of frost on the antennas or radomes and, in certain conditions, the reflection coefficients of the ground. If the value of these variables could be permanently measured, then a more efficient computation could be made of the value of the signal at any relevant point of the volume of coverage, as a function of the values of these parameters measured at any instant and as a function of other variables which it is already possible to measure. The method and device according to the invention can be used to ascertain the relevance of the model chosen, and hence to substantially reduce operating costs while at the same time improving the quality of the service provided. The invention also makes it possible, in certain cases, to provide diagnostic assistance in the event of malfunctioning.

To all these ends, an object of the invention is a method for the permanent checking of the integrity of a transmission liable to be affected by parameters that are not directly accessible to measurement and whose influence on the modulus and the phase of the field radiated in space can be determined by means of a mathematic model, the transmission being done from an array of antennas, each antenna or group of antennas of the array being supplied with one or more HF carrier frequencies, each of these frequencies being modulated in a known way by one or more pure sinusoidal low frequency signals wherein:

1) a recording is made, at least at one point and during a period of time T, of the value of the amplitude of the combination of the signal received at this point and of a signal, called a reference signal, the fundamental frequency of which is equal to one of the HF frequencies of the signal to be analyzed;

2) the amplitude of the frequency components of the signal thus obtained is extracted and memorized;

3) the steps 1 and 2 are started again n times (n designating a whole number) in recording the signal at the same point and in carrying out, at each time, a phase shift of the reference signal by a quantity $$\alpha_k = \frac{2\pi}{n},$$

k being a whole number that successively assumes all the values between 1 and n;

4) the n amplitudes thus memorized are processed as the n values of a function $F(\alpha_k)$, from which the values of certain coefficients of its Fourier transform are extracted;

5) all the operations 1 to 4 are started again at least as many times as there are points of measurement;

6) the values of the unknown parameters are determined by the use of the mathematical model.

The recording point could be either within the radome of an antenna and, in this case, the signal at this point will represent the signal transmitted by this antenna, or outside it and, in this case, the signal at this point will represent the signal resulting from the entire array. In the latter case, the point will preferably be located in the vicinity of the array.

The period of time T will preferably be a whole number of periods of the low frequency signal to be analyzed.

The values of the coefficients of the Fourier transform of the functions of $\alpha_k$ may be, in particular, the continuous component or the phase and the amplitude of the component at the periodicity $2\pi$.

The theoretical principles that have led to the use of the above-described method shall be explained here below by means of a fictitious example which has been deliberately kept simple.

Let us consider two antennas A and B separated by a distance 1. The antenna A is supplied by a signal of the form:

$$a \cos(\omega t + \phi_1) \cos \Omega_1 t$$

and the antenna B by a signal of the form:

$$b \cos(\omega t + \phi_2) \cos \Omega_2 t$$

In this example, a and b represent the moduli of the signals, w the radian frequency of the carrier, $\Omega_1$ and $\Omega_2$ the modulation radian frequencies, $\phi_1$ and $\phi_2$ the phase of the carrier on each of the antennas A and B at the instant t=0.

It is assumed that a sensor placed at any point of space will receive a signal coming from these two antennas that is a known function of known elements such as the distance from the sensor to the antenna and the absorption coefficient of the atmosphere. The distance to the sensor is considered to be an invariant and the absorption as attenuating, in the same way, the signals transmitted by each of the antennas. It is assumed, on the contrary, that the coefficients of transmission of the antennas $T_A$ and $T_B$ will be variable independently as a function of the meteorological conditions (the presence of water, snow or frost on the antenna radomes).

The model that has been chosen therefore leads to the assumption that, at a point of space, a signal with the following form will be received:

$$T_A a \cos(\omega t + \phi_a) \cos \Omega_1 t + T_B b \cos(\omega t + \phi_b) \cos \Omega_2 t$$

The conditions required for applying the method are therefore well and truly present. There is a signal whose modulus and phase at a point are capable of being affected by two parameters $T_A$ and $T_B$ which cannot be permanently measured during the transmission. The influence of this parameter on the components of the received signal can be modelized.

The first step of the method will lie in the recording, at a point located in the vicinity of the array of antennas, of a signal that is the sum of the signal transmitted at this point by the array of antennas and a signal, called a reference signal, at the same frequency as the carrier. A point located in the vicinity of the antenna array is defined herein as a point that is close enough for the signal picked up at this point to be brought into the installations participating in the transmission (for example the control room) by means of coaxial cables or guides while at the same time retaining a value that is sufficient for the requirements of the measurement. In the fictitious example described herein, it shall be assumed that the reference signal has the form:

$$E = E_o \cos(\omega t + \phi_o + \alpha_k)$$

In this expression, $\omega$ is the frequency of the common carrier, $\phi_o$ the phase for $t=0$ and $\alpha_k$ is a phase shift that will successively take all the values between $2\pi/n$ and $2\pi$ in increments of $2\pi/n$. The addition of the reference signal and of the array signal entails the assumption that the reference signal has met certain conditions:

it must be sufficient to introduce a significant variation of the average level;

it must be neither too weak nor too strong so that the combined signal is never in a state of overmodulation.

While these conditions are not excessively restrictive, they call for a sequence of calibration designed to determine the optimum value to be placed on a programmable attenuator as a function of the signal to be analyzed and, possibly, of the value of the phase.

Under these conditions, the sum signal is written as:

$$E_o + E_A + E_B = a' \cos(\omega t + \phi_a) \cos \Omega_1 t + b' \cos(\omega t + \phi_b) \cos \Omega_2 t + E_o \cos(\omega t + \phi_o + \alpha_k)$$

with
$a' = \|T_A a\|, b' = \|T_B b\|$
$\phi_a = \phi_1 + \arg T_A$
$\phi_b = \phi_2 + \arg T_B$ It is known that if $z_1$, $z_2$, $z_3$ designate three complex numbers, the sum $z_1 z_2 z_3$ will have, as its modulus, $|z_1 + z_2 + z_3|$, such that $$\|z_1 + z_2 + z_3\|^2 = \|z_1\|^2 + \|z_2\|^2 + \|z_3\|^2 + 2\|z_1\| \cdot \|z_2\| \cos \widehat{z_1 z_2} + 2\|z_1\| \cdot \|z_3\| \cos \widehat{z_1 z_3} + 2\|z_2\| \cdot \|z_3\| \cos \widehat{z_2 z_3}$$

After detection, the expression of the modulus of the signal $|S|$ is written as:

$$\|S\|^2 = a'^2 \cos^2 \Omega_1 t + b'^2 \cos^2 \Omega_2 t + E_o^2 + 2a'b' \cos \Omega_1 t \cos \Omega_2 t \cos(\phi_a - \phi_b) + 2a'E_o \cos \Omega_1 t \cos(\phi_o + \alpha_k - \phi_a) + 2b'E_o \cos \Omega_2 t \cos(\phi_o + \alpha_k - \phi_b)$$

The above sum signal $\|S\|$ is the combination signal described in the step 1 of the method. To carry out the step 2, it is further necessary to filter the signal around low frequencies that appear in the mathematical expression of combination signal. The choice of filtering to be made is limited by the form of the mathematical expression of the signal obtained after detection. In the simple example chosen, the terms that are promising for the use of the method are the terms that are functions of $\alpha_k$. This is also true in general. The mathematical form of $|S|$ further includes $\cos^2\Omega_1 t \cos^2\Omega_2 t$ terms which may be analyzed as signals varying according to the radian frequencies $2\Omega_1$ or $2\Omega_2$, $\cos\Omega_1 t \cos\Omega_2 t$ terms that can be analyzed as a sum of signals varying according to the radian frequencies $(\Omega_1+\Omega_2)$ and $(\Omega_1-\Omega_2)$ and finally $\cos \Omega_1 t$ and $\cos \Omega_2 t$ terms. It is therefore possible to carry out filtrations centered on radian frequencies 0, $2\Omega_1$, $2\Omega_2$, $(\Omega_1+\Omega_2)$, $(\Omega_1-\Omega_2)$, $Q_1$, $Q_2$.

We can thus see, in this simple example, that the choices possible are simple linear combinations of $Q_1$ and $Q_2$. There will be an opportunity to verify this again with other examples. Among the possible choices, preference will be given to those giving access to the unknown parameters and giving this access in a simple way. In the fictitious example chosen if, for example, the filtering is done on then a signal $S_A$ is obtained at output of the filter with the form:

$$S_A \alpha \, a'E_o \cos \Omega_1 t \cos(\phi_o + \alpha_k - \phi_A).$$

If this signal is recorded for a number of periods that is a whole number, then it will be possible to make an extraction, from this recording, of the amplitude of $S_A$ which is equal, in this case, to:

$$|S_A| \alpha \, a'E_o \cos(\phi_o + \alpha_k - \phi_A)$$

In this case, the period of time T in question for the second step of the method is equal to a whole number of periods of the signal at the radian frequency $\Omega_1$. In the example chosen to obtain $T_B$, it will also be necessary to do a filtering on $\Omega_2$ for a period of time T corresponding to a number of periods, that is a whole number, of the signal at the pulse $\Omega_2$.

Most usually, when the filtering is done on a linear combination of the different modulation radian frequencies, the period of time T will be a whole number multiple of a period of time $T_m$ equal to the least common multiple LCM of the different real periods coming into the play in the chosen combination. The term "real" is used in order to take account of the fact that the period corresponding, for example, to the signal at the radian frequency $2\Omega_1$ is half of the corresponding to the signal at the radian frequency $\Omega_1$. In the same way, while a term at the radian frequency $\Omega_1+\Omega_2$ or $\Omega_1-\Omega_2$ appears in the combination, the real period to be taken into account for this term is the LCM of the periods corresponding to $\Omega_1$ and $\Omega_2$. If a parallel filtering is done on several combinations, the period of time $T_M$ will be at least equal to the longest of the periods of time determined as indicated here above but it will be necessary, at the output of each of the filters, to have sequencers interrupting the recording at the end of a period of time T that is a whole number multiple of the period of time $T_m$ corresponding to the period of the filtered combination. If a series filtering is done, each of the successive periods of time T will be equal to a whole number multiple of the period of the filtered signal and the sequencing of the recordings will have to take account of these different periods of time. It is necessary to filter each of the signals on a number of periods that is a whole number in order to have the highest possible precision on the value of the amplitude of the filtered signal. This point shall be explained in greater detail further below with reference to an exemplary embodiment. It has been seen further above that the output signal of the filter centered on the frequency corresponding to the radian frequency $\Omega_1$ was $$S_A \alpha \, a'E_o \cos(\phi_o + \alpha_k - \phi_A) \cos \Omega_1 t.$$

The modulus of this signal is equal to:

$$|S_A| \alpha \, a'E_o \cos(\phi_o + \alpha_k - \phi_a).$$

This extraction ends the second step of the method described here above.

Figure 1A:
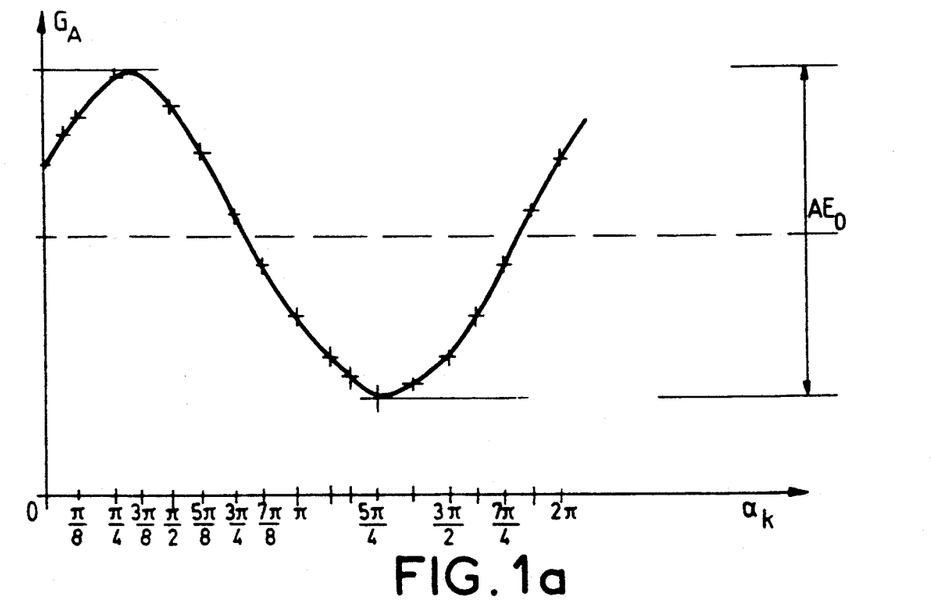
FIGS. 1a and 1b show waveforms of signals utilized for explaining operation of the device according to the invention.

If the measurement is now started again n times in incrementing $\alpha_k$ each time by a value $$\frac{2\pi}{n}$$

thus carrying out the third step of the method, it is possible to represent $S_A$ as a function of $\alpha_k$. These variations are shown in FIG. 1a when $\alpha_k$ varies between 0 and $2\pi$ in steps of $$\frac{2\pi}{n},$$

n being chosen as equal to 16 in the example.

It will be noted that, in the simple example chosen, the difference between the maximum and the minimum of this function is equal to $2a'E_o$ and the phase of this function is equal to:

$$\phi_o - \phi_a.$$

The extraction of these two variables constitutes the fourth step of the method described here above.

These two variables are the phase and amplitude of the coefficient for the periodicity $2\pi$ of the Fourier transform of the function of $\alpha_k$.

Figure 1B:
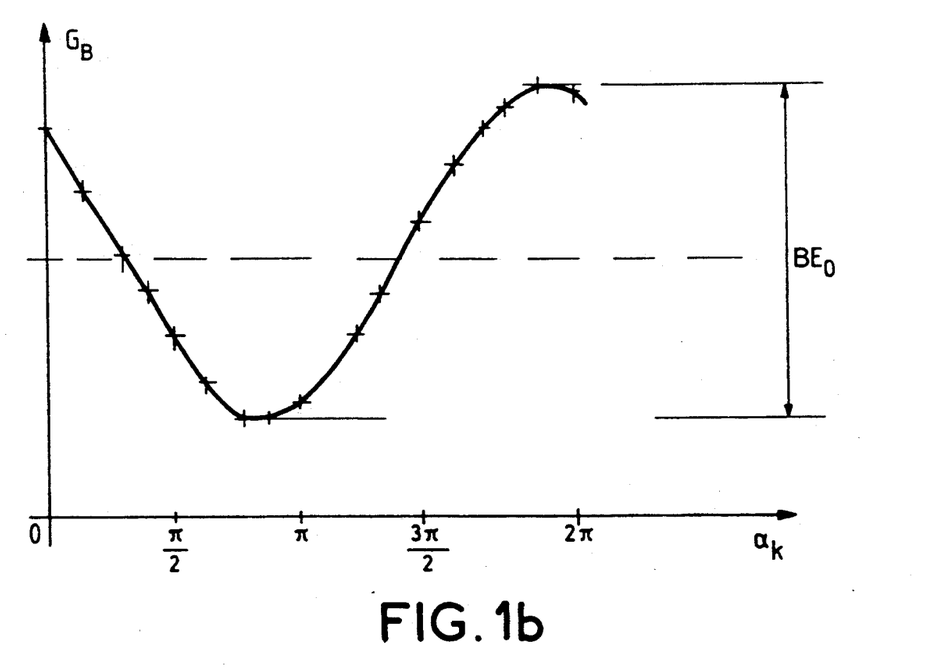

If a filtering is now done on a frequency corresponding to the radian frequency $\Omega_2$, the function obtained in the same way when $\alpha_k$ varies between .0 and $2\pi$ is shown in FIG. 1b. The difference between the maximum and the minimum of this function is equal to $2b'E$ and the phase of this function is equal to:

$$\phi_o - \phi_b.$$

The knowledge of each of the variables $|S_A|$ and $|S_B|$ as a function of $\alpha_k$ therefore provides for permanent access to the phase shift and to the attenuation, given by each of the antenna A and B, which have been called the gains. It is enough to take up the mathematical model again and write:

$$a' = \frac{S_a}{E_o} = \|T_A a\|$$

$$b' = \frac{S_b}{E_o} = \|T_B b\|$$

$$\phi_o - \phi_a = \phi_o - \phi_1 - arg\, T_a$$

$$\phi_o - \phi_b = \phi_o - \phi_2 - arg\, T_b$$

to carry out the last step of the method. It is noted that all the phases and voltages are measured with respect to the amplitude and phase of the reference signal. The values of a, b, $\phi_1$, $\phi_2$ will be obtained through the analysis, by the same process, of the signals from the sensors at each of the antennas A and B.

The method is said to be permanent in the sense that, firstly, it is not necessary to interrupt the transmission to carry out the measurement and that, secondly, the measurement may be renewed permanently by repetition of the method.

The invention also relates to a device for the measurement of parameters of a transmission that is not directly accessible to measurement and whose influence on the modulus and phase of the transmission at a point can be determined by means of a mathematical model, the transmission being done from an array of antennas, each antenna or group of antennas of the array being supplied by means of one or more transmitters with a common HF carrier frequency, this frequency being modulated, for each of the antennas, by one or more pure low frequency sinusoidal signals, wherein the device comprises:

couplers receiving the supply currents of the antennas;

sensors placed near the antenna array;

a summator having two inputs and one output and receiving one of the signals coming from a sensor at one of its inputs by means of a programmable HF change-over switch enabling the successive connection of each of the sensors and couplers and receiving, at the other input, by means of a programmable phase-shifter, a so-called reference signal picked up by means of a coupler at output of one of the transmitters participating in the transmission, the output of the summator being connected to a detector;

a computer receiving the signal at output of the detector by means of an acquisition card and sending control signals, by means of an interface card, towards the phase-shifter and towards the high frequency change-over switch.

These two cards are not always necessary. Their presence depends on the computer used and on the levels needed for the inputs and outputs. The presence of the couplers may not be necessary if the mathematical model does not call for a knowledge of the antenna currents. The above-described device, which is capable of performing the method according to the invention, has no filters, for the filtering is done digitally by the computer. It would clearly be possible to place a series of filters at an output of the detector, each of the filters being centered on a frequency that is a linear combination of modulation frequencies, a programmable change-over switch directing the signal output of the filter towards the acquisition card.

In certain cases, a combined approach with digital filtering, for example, for the lower low frequencies and analog filtering for the higher low frequencies would provide for a suitable compromise if the frequency of acquisition of the samples permitted by the acquisition card is not high enough.

Similarly, it has been stated in the description of the method that it is appropriate for the reference signal and the signal coming from the sensor to have comparable levels. If this is not so, a programmable attenuator could be placed between the output of the sensors change-over switch and the input of the summator, the choice of the attenuation being determined by prior calibration. The attenuator is controlled by the computer by means of the interface card as a function of the sensor that has been switched to.

The method and device of the invention shall now be illustrated with reference to the appended drawings and to two exemplary embodiments. The first example relates to the measurement of parameters liable to affect the signal emitted by an ILS glide path radio beacon. The second example, which shall be described more briefly, relates to the measurement of parameters capable of affecting the transmission of a Doppler VOR.

MORE DETAILED DESCRIPTION

Figure 2:
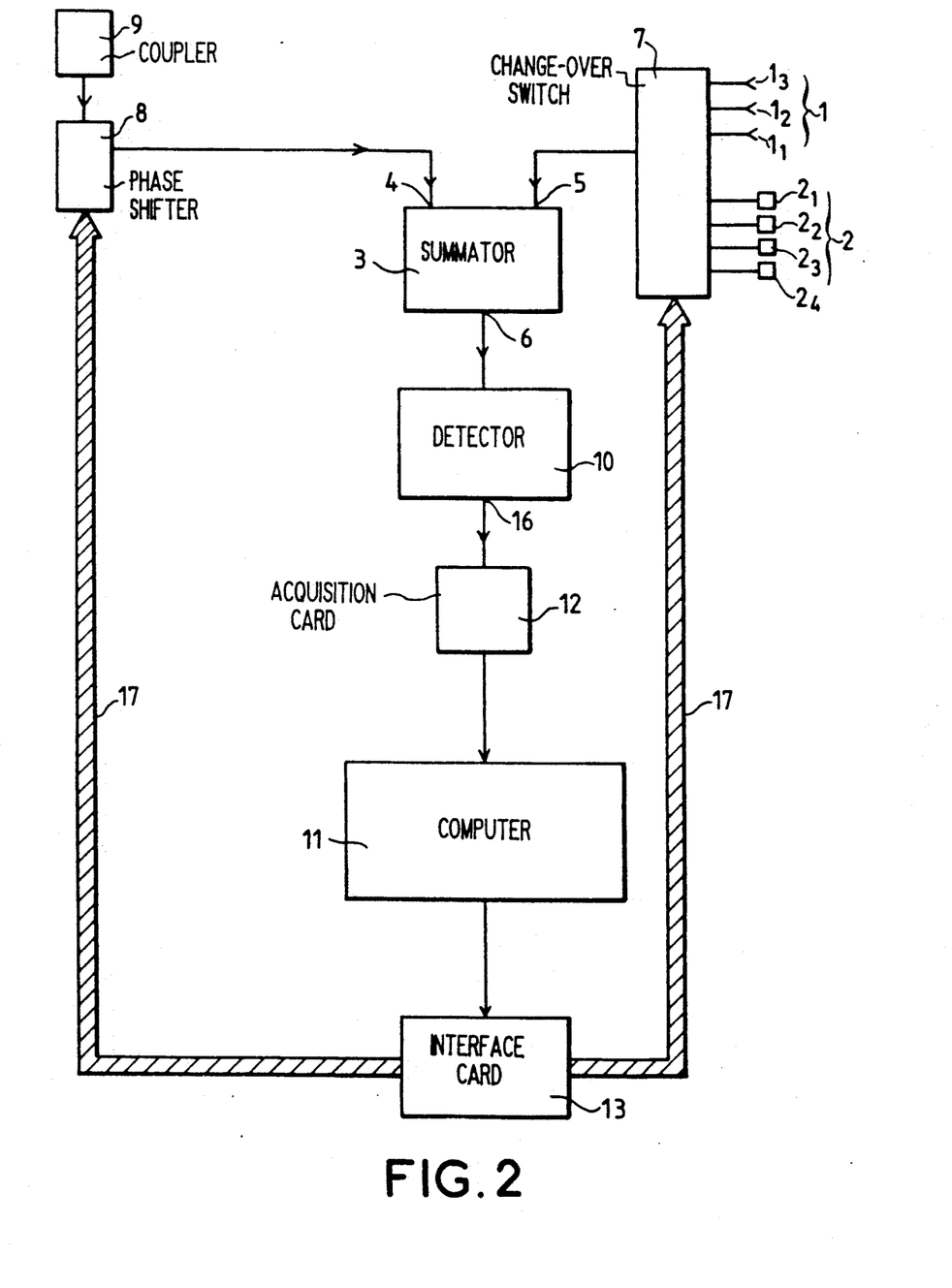
FIG. 2 shows the general form of the device according to the invention.

FIG. 2, which represents the device according to the invention, shows:

couplers 1 receiving supply currents for the antennas at output of the transmitters;

sensors 2 placed in the vicinity of the antenna array;

a summator 3 comprising two inputs 4, 5 and one output 6 and receiving the signal from the selected sensor 2 or coupler 1 at one of its inputs 5, by means of an HF programmable change-over switch 7, enabling the successive connecting of each of the sensors 2 and couplers 1, and a so-called reference signal at the other input 4, through a programmable phase-shifter 8, the reference signal being picked up by means of a coupler 9 at an output of one of the transmitters participating in the transmission, the output 6 of the summator being connected to a detector 10;

a computer 11 receiving the output signal 16 from the detector 10 through an acquisition card 12 and sending control signals towards the phase-shifter and the high-frequency change-over switch 7 through an interface card 13. The buses 17 for the transmission of the control bits coming from the computer are shaded in the drawing. Preferably, the programmable phase-shifter 8 is a phase-shifter with $2^P$ positions.

Figure 3:
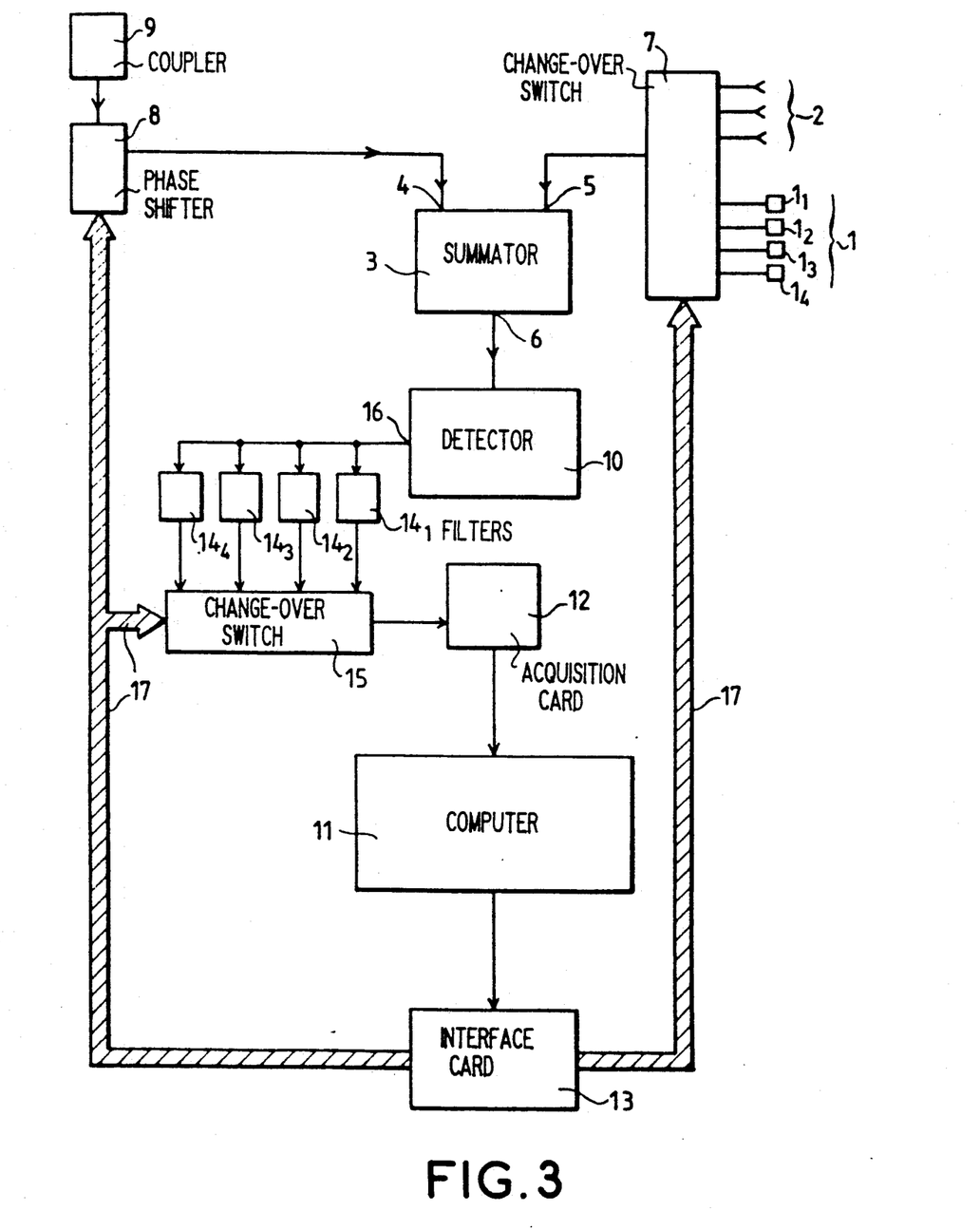
FIG. 3 shows a variant of the general device according to the invention (with switch and analog filter)

FIG. 3 shows a variant of the device according to the invention wherein filtering at an output of the detector 10 is done by a series of analog filters 14, each filter being centered on a frequency which is most generally a linear combination of different modulation frequencies of the HF carrier. In this case, the output 16 of the detector is connected to the series of filters 14 and a programmable change-over switch 15, controlled by the computer 11 by means of the control matching interface card 13, selects the recorded filter output. This change-over switch function may be included in the acquisition card.

Figure 4:
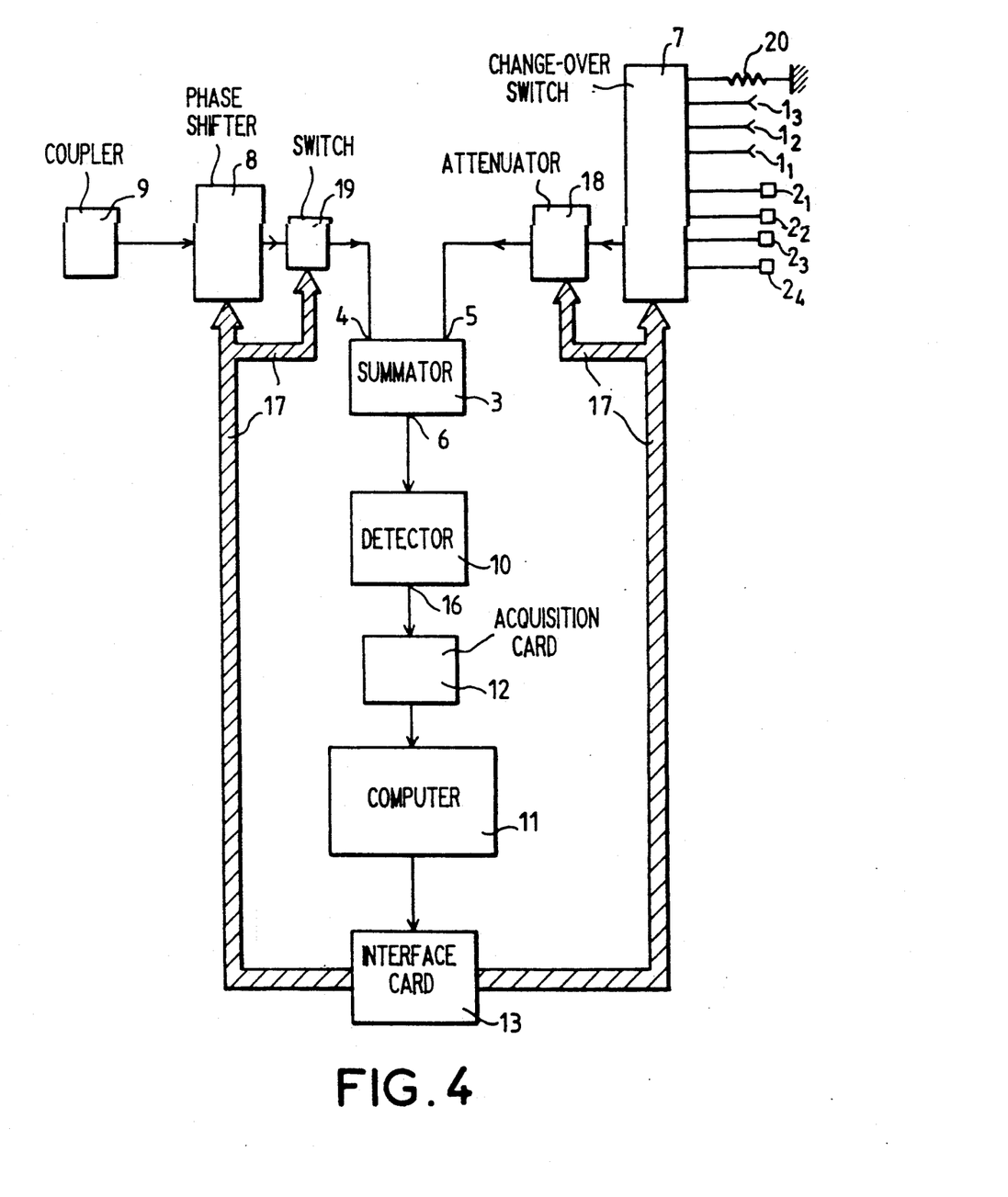
FIG. 4 shows another variant of the general device according to the invention (with attenuator and diode switch)

FIG. 4 shows another alternative embodiment in which the output of the input signal change-over switch 7 supplies a programmable attenuator 18, the output of which is connected to the input 5 of the summator 3. A diode switch 19, controlled by the computer connected between the output of the phase-shifter 8 and the input 4 of the summator 3, makes it possible to interrupt the arrival of the reference signal. The change-over switch 7 has a position enabling the selection of a load 20.

Figure 5:
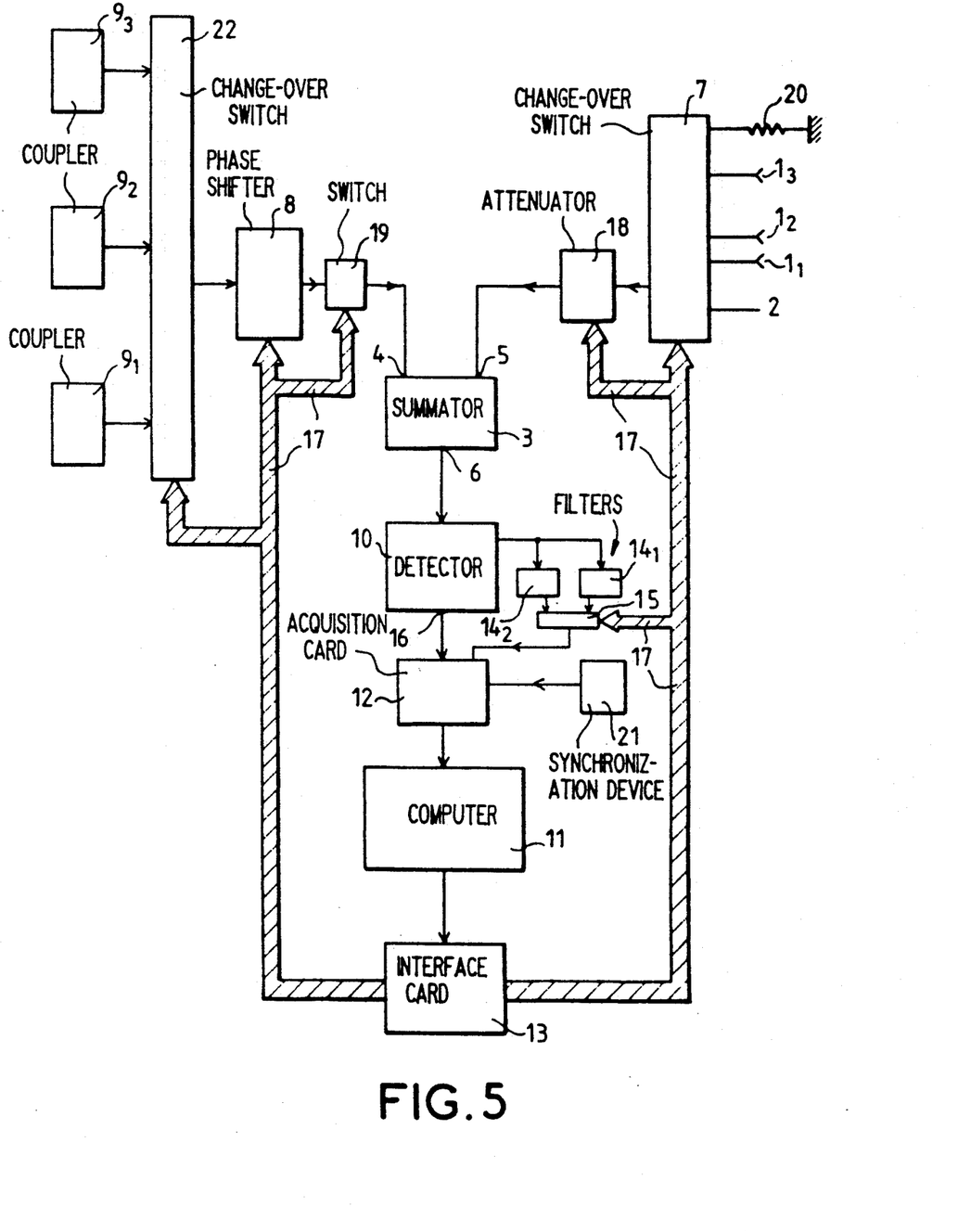
FIG. 5 shows another variant of the device according to the invention (with several couplers for the introducing of the reference signal)

The device of FIG. 5 differs from the above devices in that the reference signal can be chosen by the computer 11. To this effect, it has several couplers $9_1$ to $9_3$ (in the case of FIG. 5). The output of each of these couplers can be selected by means of a programmable HF change-over switch 22. A synchronization device 21 enables the synchronization signals to be sent towards the acquisition card 12. The output of the detector 10 supplies the acquisition card 12, on the one hand directly and, on the other hand, by means of filters 14-1, 14-2, the output of which is controlled by the programmable change-over switch 15.

Figure 6:
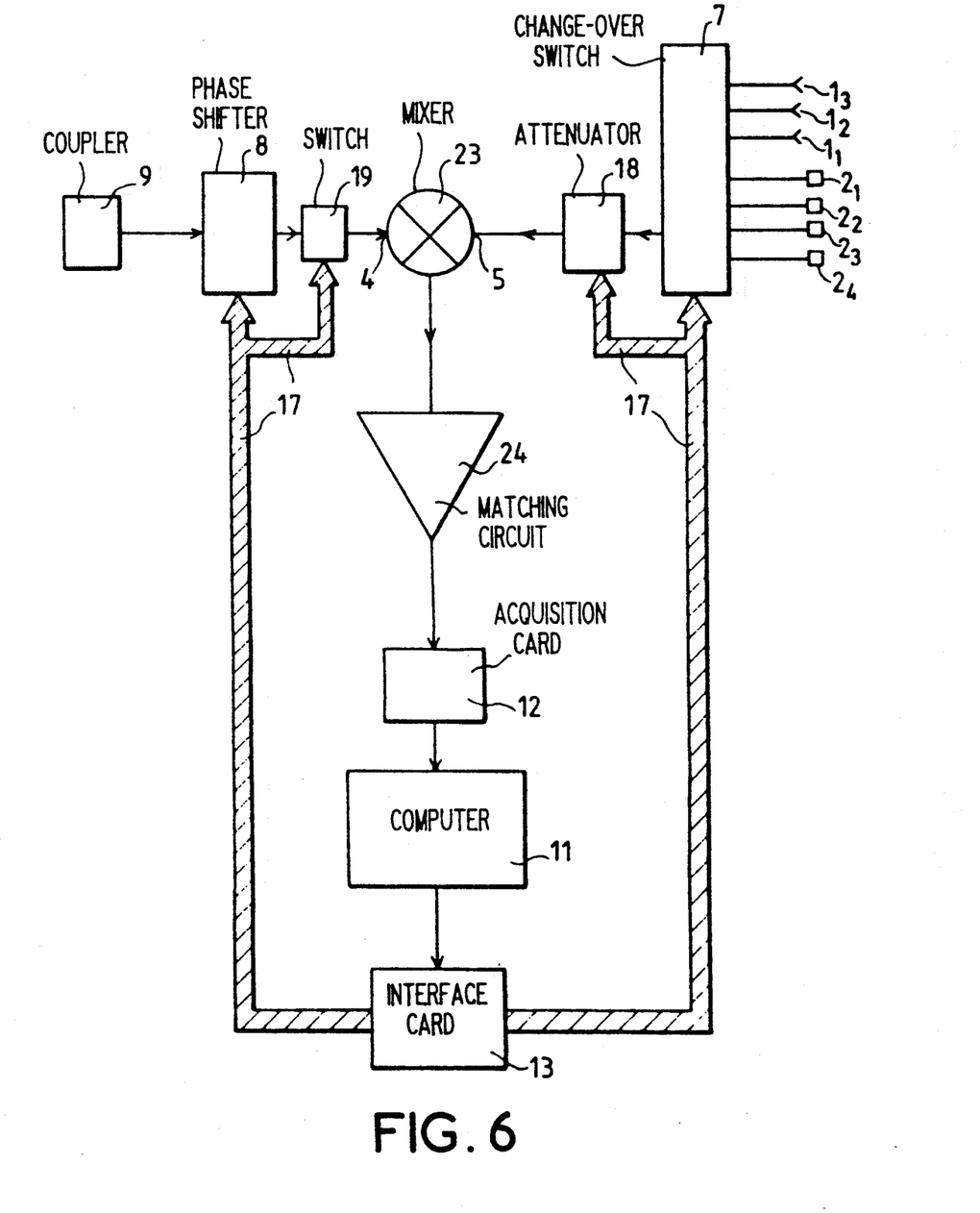
FIG. 6 shows another variant of the device according to the invention (with a mixer instead of a summator and a detector).

FIG. 6 shows the device according to the invention in which the summator has been replaced by a mixer 23, receiving the reference signal and the signal from the change-over switch 7. The output of the mixer supplies a matching circuit 24. The output of the circuit 24 is connected to the acquisition card 12.

The assemblies shown in FIGS. 1 to 6 do not restrict the scope of the invention. In particular, it is specified that the number of couplers 9 may be as great as the number of antennas of the array. A single sensor 2, without any coupler 1, may enable the making of the device according to the invention.

The device of FIG. 4 has been used to check the integrity of the transmission of the glide path of an ILS in using the method according to the invention. This exemplary embodiment shall now be described in detail.

It is recalled that the signal transmitted by a glide path transmitter is made up of three signals:

A so-called CSB signal with the form $$CSB = P_1 [1+m (\sin \Omega_1 t + \sin \Omega_2 t)] \cos (\omega t + \phi_1)$$

A so-called SBO signal with the form:

$$SBO + B_1 (\sin \Omega_1 t - \sin \Omega_2 t) \cos (\omega t + \phi_2)$$

A so-called clearance signal with the form:

$$C = C_1 (1 + M_1 \sin \Omega_1 t + M_2 \sin \Omega_2 t) \cos [(\omega + \Delta)t + \phi_3]$$

In these expressions, $w_1$, $\phi_1$, $\phi_2$, $\phi_3$ are respectively the radian frequency of the carrier and the phase-shifts of the carrier at the instant $t=0$.

$\Omega_1$ and $\Omega_2$ are two modulation radian frequencies, $\Omega_1 = 2\pi \times 90$ and $\Omega_2 = 2\pi \times 150$ $P_1 B_1 C_1$ are the amplitudes of the signals.

The guiding signal on the glide path is called the DDM and its value at a point is:

$$DDM = \frac{B_1}{P_1} \cos (\phi_2 - \phi_1)$$

The expression indicates that the DDM signal is the scalar product of the vectors representing the CSB and SBO fields at this point.

The clearance signal is on a carrier separated from the DDM carrier by a difference $\Delta$ equal to 18 KHz. It can thus be roughly estimated that this signal is separated by the filtering of the CSB and SBO signals.

The mathematical model chosen is constituted as follows:

The two vectors CSB and SBO are complex functions of the supply currents of the antennas of the transmission array, as well as external elements capable of influencing the electromagnetic fields at the onboard receiver.

In particular, the radiation reflected by the ground in the immediate vicinity of the antennas plays an essential role. It may be characterized by a complex reflection coefficient $\rho$ multiplying the field radiated by a fictitious antenna, which is the "image" of the real antenna, by the plane of the ground.

If U represents the direct path between the antenna and the receiver, and V the path from the "image" antenna, the overall factor affecting the radiation of the antenna is obtained by multiplying its supply current by a term:

$$\Sigma = U + \rho V$$

If Bi represents the supply current SBO of the ith antenna, Pi the current CSB and Ti a coefficient representing its possible state (such as the presence of frost, water, etc.), then we obtain, for the total fields:

$$CSB = \sum_i TiPi \Sigma i \quad SBO = \sum TiBi \Sigma i$$

representing the fields radiated in the immediate vicinity of the antenna array, i.e. without taking account of any reflections of the transmission on distant relief features.

The sum relates to all the antennas.

These expressions enable a better assessment of the influence of the different factors on the signal in space.

These factors may be classified into two main groups:
internal factors:
* CSB, SBO and Clearance supply currents
external factors:
* geometrical position of the real and image antennas;
* reflection coefficient of the ground (characteristic of the geometry and nature of the ground over a distance of about 500 meters before the array)
* transmission coefficient of the antennas.

In the case of the glide path transmitters of the ILS, the array is formed by three antennas placed on a same vertical mast. The antenna currents are picked up by three couplers $1_1$, $1_2$, $1_3$ placed at the antenna sources. The variable parameters to be measured to make the mathematical model work are therefore the transmission coefficients of the antennas $T_i$, which are therefore three in number, and the reflection coefficient of the ground $\rho$. It has been assumed that this coefficient is the same for each of the three antennas. There is therefore a total of four parameters to be measured. For the embodiment particular to the ILS, four external sensors $2_1$ to $2_4$ are positioned. These sensors are placed vertically on top of one another on an already existing mast, on which the sensor forming part of the ILS monitoring installation is mounted as defined by the ICAO. The existing sensor forms part of the group of four sensors $2_1$ to $2_4$.

This mast is positioned at 85 m from the antennas. The signal is brought to the measuring installation by four coaxial cables.

The reference signal chosen, which is introduced by means of the coupler 9 into the programmable phase-shifter 8 is the CSB signal. Its expression is:

$$P_{ref} = P_o \cos[\omega t + a(k) + \phi_o](1 + m(\sin \Omega_1 t + \sin \Omega_2 t))$$

The signal received at the output 16 of the detector 10 is therefore the sum of this signal and of the signal coming from one of the four sensors.

The result of the detection will be written as being the square root of the sum of the moduli plus the double products of the moduli and of the respective phases of each term (general formula $D = V_1^2 + V_2^2 + 2V_1V_2 \cos \delta\phi$)

We obtain:

$$D^2 = [P_o(1 + m\sin \Omega_1 t + m\sin \Omega_2 t)]^2 + \\
[P_1(1 + m\sin \Omega_1 t + m\sin \Omega_2 t)]^2 + [B_1(\sin \Omega_1 t + \sin \Omega_2 t)]^2 + \\
2P_1P_o(1 + m\sin \Omega_1 t + m\sin \Omega_2 t)(1 + m\sin \Omega_1 t + \\
m\sin \Omega_2 t) \cos[\phi_1 - a(k) - \phi_o] + 2P_oB_1(1 + m\sin \Omega_1 t + \\
m\sin \Omega_2 t)(\sin \Omega_1 t - \sin \Omega_2 t) \cos[\phi_2 - a(k) - \phi_o] + \\
2P_1B_1(1 + m\sin \Omega_1 t + m\sin \Omega_2 t)(\sin \Omega_1 t - \\
\sin \Omega_2 t) \cos(\phi_1 - \phi_2)$$

In developing this expression, and in keeping only the terms $\Omega_1 t$ and $\Omega_2 t$ terms, the other terms being eliminated by the filtering on $\Omega_1$ and then on $\Omega_2$, we get:

$$D^2 = [P_o^2 2m + P_1^2 2m + 4mP_1P_o \cos[\phi_1 - a(k) - \phi_o] + \\
2P_oB_1 \cos[\phi_2 - a(k) - \phi_o] + 2P_1B_1 \cos(\phi_1 - \phi_2)] \sin \Omega_1 t + \\
[P_o^2 2m + P_1^2 2m + 4mP_1P_o \cos[\phi_1 - a(k) - \phi_o] - \\
2P_oB_1 \cos[\phi_2 - a(k) - \phi_o] - \\
2P_1B_1 \cos(\phi_1 - \phi_2)] \sin \Omega_2 t + \ldots$$

The filtering will give us the moduli of the two vectors V90 and V150 corresponding to $\Omega_1 t$ and $\Omega_2 t$.

The expression of the sum and difference are therefore:

$$V90 + V150 = 4mP_o^2 + 4m P_1^2 + 8m P_1P_o \cos \\
(\phi_1 - ak - \phi o) = S_k$$

$$V90 - V150 = 4 PoB_1 \cos(\phi_2 - ak - \phi o) + 4 P_1 B_1 \cos \\
(\phi_1 - \phi_2) = D_k$$

Before describing the way in which the digital filtering is done, it is necessary to explain how the acquisition of the data is done.

The acquisition consists in taking a certain number of samples, 540 samples in this case, at 0.185 ms intervals of the signal coming from the detector. The analog/digital operations ar taken charge of by the acquisition card 12 which is directly controlled by a program of the computer 11. The sample covers three complete periods of the composite ILS signal, i.e. 100 ms (the frequency of the 90+150 Hz signal is 30 Hz).

This operation is renewed for the 16 positions of the phase-shifter.

Thus, a complete measurement is obtained, relating to one of the sensors to be analyzed.

The conditions of the measurement (the value of the attenuation and whether or not the reference signal is present) are set by software means.

The filtering consists in the extraction, from these 540 samples, of the modulus of the signal corresponding to the radian frequency $\Omega_1 = 2\pi \times 90$ and the one corresponding to the radian frequency $\Omega_2 = 2\pi \times 150$. Let us consider a table of 540 complex numbers with a modulus 1 and an argument $$\theta = 0.185 \times 90 \times 360° \times P$$

wherein
0.185 is the sampling period;
90 is the frequency of the signal to be filtered;
P is the order number of the element in the table;
$\theta$ thus gives the expression, in degrees, of the sampling step with respect to the 90 Hz multiplied by the order number of the sample.

Each element may be expressed by:

$$e^{j\theta p}$$

It is also necessary to take account of the fact that the signal actually analyzed is limited in time. In a standard way, a window known as a "weighting window" is used for this purpose.

The window used here is a Blackman window.

The computation actually done takes account of the multiplication of the signal by the weighting window.

The average on a period of the product:

$$\text{window} \times \text{signal} \times e^{j\theta p}$$

represents the coefficient of the 90 Hz component sought.

The coefficient of the 150 Hz component is obtained similarly.

With each of these moduli being known, it is possible to compute the modulus of the sum, namely S, and the modulus of the difference, namely D.

The operation is started again n times, in increasing the phase-shift $\alpha_k$, introduced by the phase-shifter 8, by $$\frac{2\pi}{n}$$

each time. In the embodiment, n is equal to 16.

When $\alpha_k$ varies according to the 16 values of the phase-shifter, a periodic variation of the modulus of S and D is obtained. If the argument $\alpha_k$, corresponding to each of the 16 values of the phase-shifter, is associated with each of the 16 values of moduli found respectively for S and D, two tables of 16 complex numbers are defined, each representing a periodic function of $\alpha_k$.

In accordance with the mathematical expression of S and D, defined further above, the second order term of the fast Fourier transform (FFT) of each of the two functions thus defined will be a complex number. In the case of S, its modulus will be $8mP_1P_o$ and, in the case of D it will be $4P_oB_1$. The arguments will be respectively equal to $(\phi_1 - \phi_o)$ and $(\phi_2 - \phi_o)$. If it is assumed that $P_o$ and m are constant, it is possible to obtain $P_1$ and $B_1$ except for a multiplier coefficient.

The above-described operation will be repeated for each of the four sensors $2_1$ to $2_4$. The value of the vectors $P_1$ and $P_2$ is thus available at four different positions.

To attain the values of the coefficients $\rho$ $T_1$ $T_2$ and $T_3$, it is now necessary to have the value of these very same variables at the antennas themselves.

To this end, the acquisition operation will be started again at each of the antenna couplers to obtain $P_1$ and $B_1$.

If the transmission factors (factors of phase shift and attenuation) introduced by the paths U and V are now known, it will be possible to write the equations:

$$P_1 = \sum_i T_i C_1 P_i (U_{i1} + \rho V_{i1})$$

$$B_1 = \sum_i T_i C_1 B_i (U_{i1} + \rho V_{i1})$$

for the sensor $2_1$ and the same equations for each of the other sensors.

In each of these equations, the coefficient $T_i$ represents the transmission coefficient of the antenna i. The factors C are coefficients proper to each of the sensors, namely $C_1$, $C_2$, $C_3$ $C_4$.

If we apply the ratio $$\frac{P_1}{B_1}$$

we obtain the equation:

$$\frac{P_1}{B_1} = \frac{\sum_i T_i P_i (U_{i1} + \rho V_{i1})}{\sum_i T_i B_i (u_{i1} + \rho V_{i1})} \quad (1)$$

We then have a system of four equations comprising the four unknown quantities $\rho$ $T_1$ $T_2$ $T_3$.

In these equations, E and V depend only on the distance from each antenna, i.e. the real antenna and the image antenna, to each of the sensors.

The positions of the antennas and sensors are entered in a memory of the computer in Cartesian coordinates x, y, z in a table called DATA.GLD.

The point 0 is defined by the intersection of:
the ground plane;
the vertical plane perpendicular to the runway axis and passing through the center of the first antenna;
the vertical plane parallel to the runway axis and passing through the center of the first antenna.

The positions of the image antennas are introduced by computation in taking account of the slope of the ground with respect to the horizontal that should be measured. The image antennas are considered to be symmetrical with the real antennas with respect to the real ground.

Then the distance between each of the real or image antennas and each of the sensors is computed, i.e. for a total of three real antennas $A_1$, $A_2$, $A_3$, three image antennas $A_4$, $A_5$, $A_6$, and four sensors $2_1$, $2_2$, $2_3$, $2_4$, giving 24 distances $Y_{ij}$, where i designates the index of the antenna and j the index of the sensor. If $\theta_{ij}$ designates the angle between the axis of the antenna i and the axis of the sensor j, the expression of the field received at the sensor j from the antenna i is:

$$E_{ij} = E_i \frac{\cos^2 \theta_{ij}}{Y_{ij}}$$

The expression of the antenna/sensor phase shift introduced by the time taken to travel the distance $Y_{ij}$ is:

$$\Phi_{ij} = -\frac{2\pi}{\lambda} Y_{ij}$$

The mode of establishing the four equations shall now be dealt with briefly.

The transmission factor of the antenna is written in the form:

$$T = T_i^n (1 + \zeta_i)$$

$T_i^n$ is the transmission factor measured in nominal conditions of operation, $\zeta_i$ is the variation sought in this factor.

With the following notations:

$B_i$ and $P_i$ as the SBO and CSB currents in the ith antenna $$-B_j^n = \Sigma B_i T_i^n \Sigma_{ij} \quad \text{et} \quad P_j^n = \Sigma P_i T_i^n \Sigma_{ij}$$

$D_j^n$ as the ratio SBO/CSB measured on the $j^{th}$ sensor, the $\zeta_i$ values are determined from the matrix system of j equations with I unknown quantities:

$$Y_j = W_{ji} \zeta_i$$

with $Y_j = D_j^m P_j^n - B_j^i$ and $$W_{ji} = \{B_i - D_j^m P_i\} T_i^n \Sigma_{ij}$$

the matrix $W_{ji}$ is degenerated (zero determinant) and the resolution implies a process of approximation with a certain choice of constraints. In the present case, given the terms of the problem, a choice is made of the minimization of the functional: $||W-Y||+\alpha||\zeta||$ where the parameter of regularization $\alpha_k$ minimizes the residue $||W-Y||$ according to the quadratic norm (distance function of L2).

It is known that, in these equations, $D_j^m$ is the second member of the equation (1) written further above. It is necessary to know $B_j^n D_j^n T_j^n$. The computation used to obtain these values is described here below.

This computation is done through a calibration stage, each antenna being successively supplied by a same reference signal (CSB alone).

Let us consider the coefficient $\tau_{ij}$ which is the result of the transmission sent to the sensor j by the antenna i and the image antenna i+3 of the antenna i. Only relative knowledge of these r is needed. They are therefore directly complex numbers, the moduli of which are the amplitudes of the carriers collected at the sensors and the arguments of which are the phases of these very same carriers.

A prior acquisition on the antenna couplers will enable us to measure a coupling factor for each of these couplers, in order to obtain a relative determination, that is precise in phase and in amplitude, of the supply currents of the antennas.

This means that there is a complex coupling ratio between the antenna and its coupler. With the supply current of the antenna and the current measured on the coupler being known, the coupling coefficient is deduced therefrom.

All the complex coefficients $\tau_{ij}$ constitute a matrix. Let $F_1$ and $F_2$ be two complex numbers. It may be written that:

$$\tau_{ij} = F_1 U_{ij} + F_2 V_{(i+3)j}$$

In order to eliminate the uncertainties over the relative phases between the sensors, four groups (in the case of four sensors) of three equations shall be examined.

The group of equations corresponding to the sensor j is written as:

$$\begin{vmatrix} \tau_{1j} \\ \tau_{2j} \\ \tau_{3j} \end{vmatrix} = \begin{vmatrix} U_{1j} & V_{4j} \\ U_{2j} & V_{5j} \\ U_{3j} & V_{6j} \end{vmatrix} \times \begin{vmatrix} F_{1j} \\ F_{2j} \end{vmatrix}$$

The resolving of this system of equations by multilinear regression using the least squares method enables the computation of the coefficients $F_1$ and $F_2$ and hence of the value of the coefficient $$\frac{F_{2j}}{F_{1j}}$$

which is equal to the reflection coefficient $\rho_j$ of the ground. It is assumed that the average of the $\rho_j$ thus computed constitutes the average nominal reflection coefficient $\rho$ of the ground.

On the basis of the $\tau_{ij}$, it is possible to compute the theoretical signals received by the sensors.

For the CSB signal, it is possible to write:

$$CSB_j = \sum_i^3 P_i \tau_{ij}$$

and for the signal SBO:

$$SBO_j = \sum_i^3 B_i \tau_{ij}$$

The following ratio is then computed:

$$D_j^n = \frac{CSB_j}{SBO_j}$$

To attain the relevant variables, the differences between the theoretical signals thus computed and the signals measured on the sensors, $D_j^m$, will then be exploited by computation.

We are thus really within the terms of the application of the method according to the invention to the ILS system. A mathematical model has been created which, as a function of the supply currents of the three antennas of the array of the glide path transmitter, will enable the computation of the field at a point whose coordinates are known. This field depends on four parameters which it is possible to measure directly.

In this case, before beginning the measurement phase proper, it is appropriate to carry out the calibration stages that have just been described.

This calibration stage is carried out under the initial calibration conditions and makes it possible to define nominal conditions of operation. The measurements carried out during this prior stage use the method according to the invention.

The step 5 of the method, which consists in carrying out the operations 1 to 4 for a certain number of times, is then performed.

The steps 2 to 5 of the method according to the invention are carried out once for each of the four sensors located in the vicinity of the antenna array and once for each of the antenna couplers. The reference signal introduced into the coupler 9 is the CSB signal.

The step 6 is then carried out, and all the unknown parameters of the mathematical model are found by computation.

In the foregoing, the influence of the clearance signal on the levels of the CSB and SBO signals has not been considered.

In order to know the characteristics of the clearance signal, all the steps 1 to 4 can be started again, in taking the clearance signal as the reference signal and in measuring the antenna currents by means of the couplers $1_1$ and $1_3$ (the antenna 2 receives no clearance signal).

These results combined with those obtained by the method may be used to compute the value of the ILS signal at points with known coordinates.

It is also possible to determine the locus of the points where the SBO has a determined value and, in particular, the value 0.

The comparison of this locus with the glide path enables the checking of the indications give by the array throughout the coverage space and no longer at a few points only, as was the case previously.

The general method that has just been described has variants. Thus, for example, if there are six external sensors, it will be possible, by repeating the acquisition process defined by the steps 1 to 4 for the two additional sensors, to define different reflection coefficients of the ground for each of the transmission antennas.

If, on the contrary, there is only one external sensor which is the existing sensor, it is possible to define a reflection coefficient of the ground and assume that the antenna gains are at their nominal value. This latter configuration, which is the least costly configuration for checking the integrity of the transmission of the glide path beacon of an ILS in using the method of the invention, already provides for a substantial improvement over the existing device.

The use of the method and device for the checking of a VOR radio beacon shall now be described.

The signal transmitted by a VOR radio navigation station comprises:

a first component containing the information on the reference azimuth (the magnetic north of the station);

a second component containing the information indicating the azimuth $\theta$ of the receiver with respect to the reference azimuth.

The total signal can be written in the form of a sum of three complex vectors modulating a carrier frequency with a radian frequency $\omega_o$:

$$S = M_o + A_p e^{j\Omega_s t} + A_m e^{-j\Omega_s t}$$

According to the embodiment, the representative vectors are written (assuming ideal conditions):
in the case of the "standard" VOR as $$M_o = [1 + M \cos(\Omega_1 t + \eta \sin(\Omega_o t))] e^{j\phi_o}$$

$$A_p = \frac{M}{2} e^{j\theta}$$

$$A_m = \frac{M}{2} e^{-j\theta}$$

$$\Omega_s = \Omega_o$$

in the case of the Doppler VOR as $$M_o = (1 + M \cos \Omega_o t) e^{j\phi_o}$$

$$A_p = \frac{M}{2} e^{j m \sin(\Omega_o t - \theta)}$$

$$A_m = \frac{M}{2} e^{-j m \sin(\Omega_o t - \theta)}$$

$$\Omega_s = \Omega_1$$

The following are the numerical values:

$\Omega_o = 2\pi 30$ Hz $\Omega_1 = 2\pi 9960$ Hz $M = 0,0.3$ $\rho$ $\eta = 16$ It can be easily seen that, except for the reversal of the variable phase and reference signals, the total signal is identical for both embodiments.

The ideal conditions of operation are obtained if:
a—the Ap and Am are conjugate complex vectors;
b—their sum is always in phase with the carrier $\omega_o$
c—the phase variation as a function of the azimuth is as close as possible to the ideal values.

The embodiment, in the case of the "standard" VOR essentially comprises:

a transmitter at $\omega_o$ modulated by $M_o$, supplying an omnidirectional antenna in amplitude and phase, a transmitter at $(\omega_o + \Omega_o)$ supplying an omnidirectional antenna in amplitude and having a phase that varies in azimuth as $\theta$, a transmitter at $(\omega_o - \Omega_o)$ supplying a second omnidirectional antenna in amplitude and having a phase that varies in azimuth as $-\theta$;

These two antennas are generally constituted by a combination, in phase quadrature, of two antennas having patterns of a form $\cos(\theta)$ and $\sin(\theta)$, i.e.:

$$\cos(\theta) + j \sin(\theta) \text{ et } \cos(\theta) - j \sin(\theta)$$

In the case of the Doppler VOR, the embodiment essentially comprises:

a transmitter at $\omega_o$ modulated by $M_o$ supplying an omnidirectional antenna in amplitude and in phase, a transmitter at $(\omega_o + \Omega_o)$ cyclically supplying a series of omnidirectional antennas in amplitude and in phase and positioned on a circle with a perimeter $\theta \lambda$ ($\lambda$ is the wavelength of the signal at $\omega$), a transmitter at $(\omega_o - \Omega_o)$ cyclically supplying the same series of antennas with a half-rotation lag.

It is seen that the performance characteristics of the VOR depend on a very large number of parameters:

electronic parameters: the stability of the transmitters in amplitude and phase;

antenna parameters: the stability of the patterns and of the radiated fields.

Any variation in the parameters modifies the values of the vectors $M_o$, $A_p$ and $A_m$. The precise measurement of these parameters provides for the permanent checking of the radiated characteristics.

The following are the principles of the measurement. A signal with the following form is considered:

$$M_a = R e^{j[(\omega_o + \Omega_a) t + \alpha_k]}$$

where $\Omega_a$ can assume the values 0, $\pm \Omega_1$ and $\alpha_k$ can assume k values equidistributed between 0 and $2\pi$. In practice, this is a signal that is picked up at the output of each transmitter and goes through a phase-shifter with k phase positions.

This signal is added to the signal received by a certain number of sensors placed in the vicinity of the antennas. The detection of the composite signal is therefore the modulus of the total vector, i.e.

$$||M_o + M_a + A_p e^{j\Omega_s t} + A_m e^{-j\Omega_s t}||$$

with s assuming the values 0 or 1 depending on whether the VOR is a standard one or a Doppler one.

In choosing solely the quantities that contain only $\Omega_a$ and $\alpha_k$, the following terms are obtained:

$$R[M_o^* e^{j(\Omega_a t + \alpha_k)} + M_o e^{-j(\Omega_a t + \alpha_k)}] +$$
$$R[A_p^* e^{j((\Omega_a - \Omega_s)t + \alpha_k)} + A_p e^{-j((\Omega_a - \Omega_s)t + \alpha_k)}] +$$
$$R[A_m^* e^{j((\Omega_a + \Omega_s)t + \alpha_k)} + A_m e^{-j((\Omega_a + \Omega_s)t + \alpha_k)}]$$

A first Fourier computation on the n values of the continuous component of the voltage detected will give a determination of the vectors:

$M_o$ for $\Omega_a = 0$; $A_p$ for $\Omega_a = \Omega_s$ and $A_m$ for $\Omega_a = -\Omega_s$ A second computation of the Fourier components on the n values of the voltage detected at $\Omega_s$ for $\Omega_a = 0$, i.e. of the modulus of the vector:

$$A_p^* (M_o + R\exp(j\alpha_k)) + A_m(M_o^* + \exp(-j\alpha_k))$$

will give the modulus and the phase of the combination of $A_p$ and $A_m$.

The modalities of measuring and carrying out these computations are explained here below in the case of the Doppler VOR.

In the case of the Doppler VOR, the device used is that of FIG. 5.

The acquisition card 12 has an external synchronization input M, three couplers $1_1$, $1_2$, $1_3$ that can be used to pick up the transmission current from each of the transmitters of the VOR and a HF change-over switch 22 can be used to select one of the couplers. There is only one sensor 2. The working is as follows. With the coupler $9_1$ being selected by the change-over switch 22 controlled by the computer 11, the signal at $\omega_o$ (corresponding to $\Omega_a = 0$) from the transmitter supplying the omnidirectional antenna is introduced into the input 4 of the summator 3. The signal 5 of this summator is supplied with the signal from the sensor 2. This sensor is placed on what is called the counterpoise of the VOR at the place in which the prior art "monitoring" sensor is located. The signal received by this sensor is formed by the signal transmitted by the omnidirectional antenna and the signal transmitted, in turn, by the two diametrically opposite antennas transmitting a non-modulated signal, one of them at the radian frequency $\omega_o + \Omega_1$ and the other at the radian frequency $\omega_o - \Omega_1$. There is a total of 48 antennas. During one rotation of 1/30th second, each antenna is supplied twice at 1/60th second intervals, once by a signal at the radian frequency $\omega_o + \Omega_1$ and once by a signal at the radian frequency $\omega_o - \Omega_1$. A synchronization element internal to the VOR enables the regular switching over of each of the antenna pairs. The device 21 is an element for the capture of a part of this synchronization signal.

This signal is used by the acquisition card to determine the instant of acquisition of a sample that will correspond to the instant when the signal transmitted by the transmitting antenna is at its maximum. Thus, 48 samples per rotation are obtained. Each of the samples receives an assignment. There are therefore as many assignments as there are equidistributed antennas. This operation is started again n times, with a $$\frac{2\pi}{n}$$

phase shift being added each time to the reference signal. Thus, for each antenna, an assignment has been obtained, each containing n values corresponding to each of the values of $\alpha_k$. The operation is started again in the same way, by selecting the coupler 9.2 which gives a signal that is the non-modulated signal at the frequency $\omega_o + \Omega_1$ and then by selecting the coupler 9.3 which gives a non-modulated signal at the frequency $\omega_o - \Omega_1$.

Thus, a total of three assignments per antenna is obtained, each of the assignments containing n values.

It is now possible to carry out the first and second computations defined further above.

The Fourier computation on the continuous component of the voltage detected on the n values of each of the three assignments corresponding to the first antenna, respectively for $\Omega_a = 0$, $\Omega_a = \Omega_1$ and $\Omega_a = -\Omega_1$ will give the values of $M_o$, $A_p$ and $A_m$.

The Fourier computation on the $\Omega_1$ component for $\Omega_a = 0$ on the n values derived from the first assignment relating to this antenna will give, for this antenna, the modulus and phase of the combination of $A_p$ and $A_m$.

The same series of two computations on each of the three assignments of the 47 other antennas will give the same elements for each of these antennas.

The comparison of the values obtained with limit values of tolerance will enable the checking of the integrity of the signal transmitted by the VOR station. The examination of all the values of $A_p$, $A_m$ and $M_o$ will make it possible, in certain cases, to localize a malfunctioning at one of the transmitters, one or more antennas or the reflector formed by the counterpoise.

What is claimed is:

1. A method for the permanent checking of the integrity of a transmission liable to be affected by parameters that are not directly accessible to measurement and whose influence on the modulus and the phase of the field radiated in space can be determined by means of a mathematic model, the transmission being done from an array of antennas, each antenna or group of antennas of the array being supplied with one or more HF carrier frequencies, each of these frequencies being modulated in a known way by one or more pure sinusoidal low frequency signals wherein:

1) a recording is made, at least at one point and during a period of time T, of the value of the amplitude of a combination of the signal received at this point and of a reference signal, the fundamental frequency of which is equal to one of the HF frequencies of the signal to be analyzed;
   2) the amplitude of low frequency components of the signal thus obtained is extracted and memorized;
   3) the steps 1 and 2 are repeated n times (n designating a whole number) in recording the signal at the same point and in carrying out, at each time, a phase shift of the reference signal by a quantity $$\alpha_k = \frac{2\pi}{n},$$

k being a whole number that successively assumes all the values between 1 and n;
   4) the n amplitudes thus memorized are processed as the n values of a function $F(\alpha_k)$, from which the values of certain coefficients of its Fourier transform are extracted;
   5) all the operations 1 to 4 are started again at least as many times as there are points of measurement;
   6) the values of the unknown parameters are determined by the use of the mathematical model;
   7) computing values of the field radiated at at least one relevant point of a volume of coverage of the transmission based on the determined unknown parameter values, to determine an integrity of the transmission.

2. A method according to claim 1, wherein at least one of the recording points is located within a radome of an antenna, the recorded signal representing the supply current of this antenna.

3. A method according to claim 1, wherein at least one of the recording points is located in the vicinity of the antenna array.

4. A method according to claim 1, wherein the recording time T is equal to a whole number of periods of the low frequency signal to be analyzed.

5. A method according to claim 1, wherein the steps 1 to 4 are carried out with different reference signals.

6. A method according to claim 1, designed to check the integrity of the signal transmitted by a glide path transmitter of an ILS system, said system comprising an array constituted by three antennas $A_1$, $A_2$, $A_3$ transmitting a CSB signal, a SBO signal and a clearance signal, wherein the steps 1 to 4 are carried out by placing the recording point within one of the antennas and then successively within each of the other two antennas.

7. A method according to claim 6, wherein the steps 1 to 4 are further carried out by placing the recording point at least once in the vicinity of the antenna array.

8. A method according to claim 7, wherein the steps 2 to 5 are carried out by placing the recording point in the vicinity of the antenna array, successively at four different places.

9. A method according to claim 7, wherein the steps 1 to 4 are carried out by placing the recording point in the vicinity of the antenna array, at six different places.

10. A method according to claim 7 wherein the reference signal is the CSB signal picked up at a transmitter supplying the array of antennas.

11. A method according to claim 6, wherein the recording time T is 100 milliseconds.

12. A method according to claim 6, wherein the filtering defined in the step 2 is done on the 90 Hz frequency.

13. A method according to claim 12, wherein the filtering is furthermore done on the 150 Hz frequency.

14. A method according to claim 6, wherein the number, n defined in the step 4 is equal to 16.

15. A method according to any one of claims 6, 7, or 10 to 14, wherein two functions $S(\alpha_k)$ and $D(\alpha_k)$ are created, the 16 values of which are respectively the sum and the difference of the values obtained for each of the values of $\alpha_k$ in filtering at 90 Hz and 150 Hz and wherein the coefficients extracted from the Fourier transform of each of these two functions are the amplitude and the phase of the component at the periodicity $2\pi$.

16. A method according to any one of claims 6 or 10 to 14, wherein two functions $S(\alpha_k)$ and $D(\alpha_k)$ are created, the 16 values of which are respectively the sum and the difference of the values obtained for each of the values of $\alpha_k$ in filtering at 90 Hz and 150 Hz and wherein the coefficients extracted from the Fourier transform of each of these two functions are the amplitude and the phase of the component at the periodicity $2\pi$.

17. A method according to claim 16, wherein the steps 1 to 4 are further performed in taking the clearance signal for a reference signal, the recording point being placed successively at the antennas $A_1$ and $A_3$.

18. A method according to claim 1, designed to check the integrity of a signal transmitted by a Doppler VOR station comprising an antenna array constituted by a central antenna and 48 antennas equidistributed in a circle having the central antenna as its center, the central antenna being supplied by a transmitter producing a radian frequency $\omega_o$ amplitude modulated by a signal with a radian frequency $\Omega_o$, the equidistributed antennas being successively supplied in pairs every 1/60th second, the two antennas constituting a pair being diametrically opposite, one of the antennas being supplied by a transmitter producing a pure HF radian frequency $\omega_o - \Omega_1$ and the other by a transmitter producing a pure HF radian frequency $\omega_o + \Omega_1$ wherein the recording point is located in the vicinity of the antenna array.

19. A method according to claim 18, wherein the recording time T is n/30th of a second.

20. A method according to claim 18, wherein the values recorded during one of the periods T is divided into 48 assignments, the changes in assignment being synchronized with the changes in supply of the pairs of equidistributed antennas.

21. A method according to claim 18, wherein the number n defined at the step 3 is 16.

22. A method according to claim 18, wherein the steps 1 to 4 are performed at least once with each of the signals produced by the three transmitters as a reference signal.

23. A method according to claim 22, wherein the filtering defined in the step 2 is done on the continuous component and the $\Omega_1$ component.

24. A method according to any one of claims 18, 19, 20, 22, or 23, wherein three assignments are created for each of the 48 antennas of the periphery, each of the assignments containing the n values recorded with each of the reference signals and wherein there is extracted, from the assignment made with the reference signal at the radian frequency $\omega_o$, the continuous component and a component at a fundamental frequency of the Fourier transform of the function of $\alpha_k$ and wherein, from each of the two other assignments, there is extracted the continuous component of the Fourier transform of the function of $\alpha_k$.

25. A device to carry out the measurement of parameters of a transmission that is not directly accessible to measurement and whose influence on the modulus and phase of the transmission at a point can be determined by means of a mathematical model, the transmission being done through an array of antennas, each antenna or group of antennas of the array being supplied by means of one or more transmitters with a common HF carrier frequency, this frequency being modulated, for each of the antennas, by one or more pure low frequency sinusoidal signals, wherein the device comprises:

a least one sensor placed near the antenna array;

a summator having two inputs and one output and receiving one of the signals coming from the at least one sensor at one of its inputs by means of a first programmable high frequency (HF) changeover switch enabling the successive connection of each of the sensors and receiving, at the other input, by means of a programmable phase-shifter, a reference signal picked up by means of a coupler at an output of one of the transmitters participating in the transmission, the output of the summator being input to a detector;

a computer receiving the signal at an output of the detector and outputting control signals to control the phase-shifter and the high frequency (HF) change-over switch, wherein the output of the detector is applied to an input of a plurality of analog filters, an output of each of the filters supplying a second programmable change-over switch, an output of which is input to the computer.

26. A device to carry out the measurement of parameters of a transmission that is not directly accessible to measurement and whose influence on the modulus and phase of the transmission at a point can be determined by means of a mathematical model, the transmission being done through an array of antennas, each antenna or group of antennas of the array being supplied by means of one or more transmitters with a common HF carrier frequency, this frequency being modulated, for each of the antennas, by one or more pure low frequency sinusoidal signals, wherein the device comprises:

at least one sensor placed near the antenna array;

a summator having first and second inputs and one output and receiving one of the signals coming from the at least one sensor at its first input by means of a programmable high frequency (HF) change-over switch enabling the successive connection of each of the sensors and receiving, at its second input, by means of a programmable phase-shifter, a reference signal picked up by means of a coupler at an output of one of the transmitters participating in the transmission, the output of the summator being input to a detector;

a computer receiving the signal at an output of the detector and outputting control signals to control the phase-shifter and the high frequency (HF) change-over switch, wherein a programmable attenuator is connected between the output of the high frequency (HF) change-over switch and the first input of the summator.

27. A device according to claim 26, wherein a diode switch is inserted between the output of the phase-shifter and the input of the summator.

28. A device according to claim 27, wherein the input of the change-over switch is further connected to three couplers and to a load.

29. A device according to claim 28, comprising a programmable change-over switch, the output of which is connected to the input of the phase-shifter and the inputs of which are connected to at least couplers.

30. A device according to any one of claims 25 or 29, wherein the computer is supplied by a synchronization device.

31. A device according to any of the claims 25 or 26, wherein the summator and the detector are replaced by a mixer having two inputs and one output, the mixer receiving the output signal of the attenuator at one of its inputs and the output signal of the phase-shifter at the other input, and a matching circuit receiving the output signal from the mixer at its input and supplying the computer at its output.

* * * * *